Figure 2:
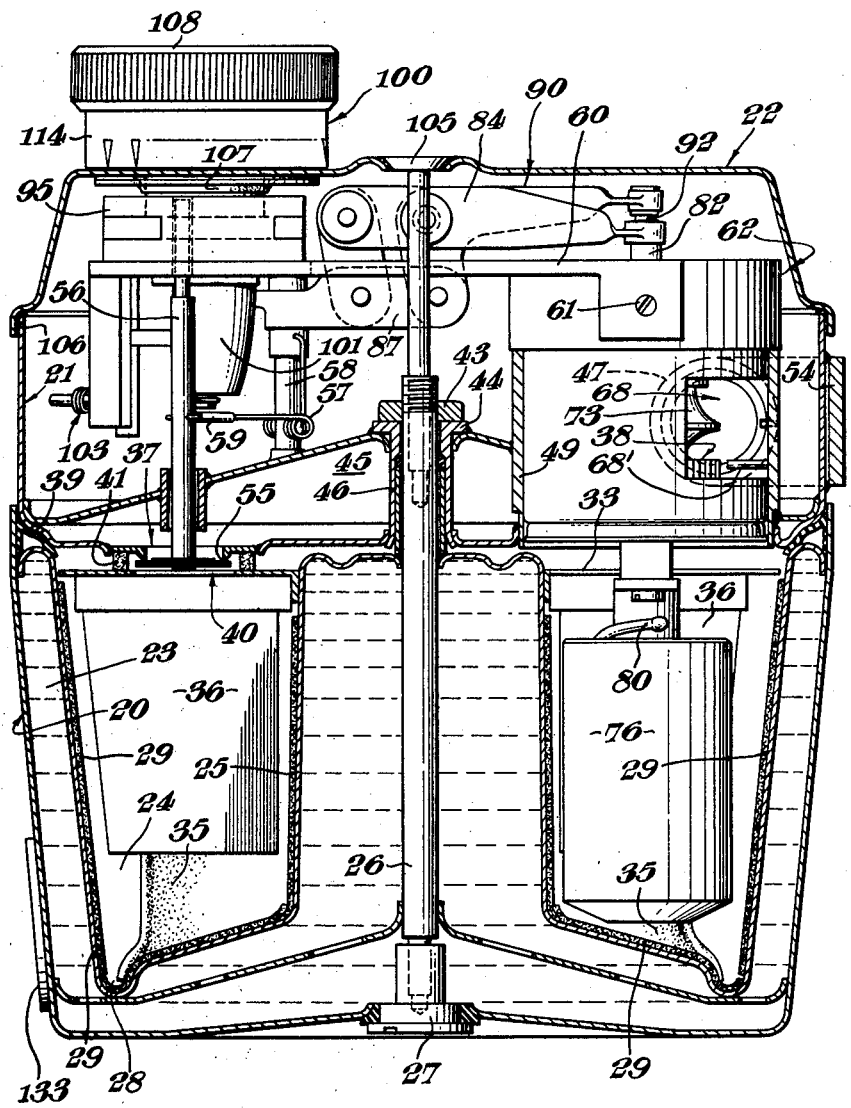

Dec. 22, 1964    F. H. GARDNER ETAL    3,162,192
ANAESTHETIC AND ANALGESIC INHALERS
Filed Oct. 9, 1962    5 Sheets-Sheet 1
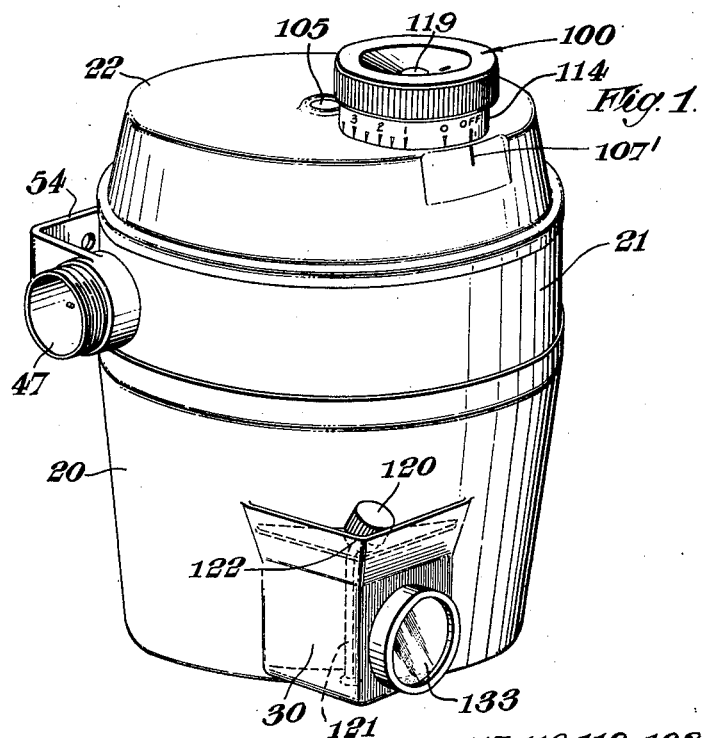
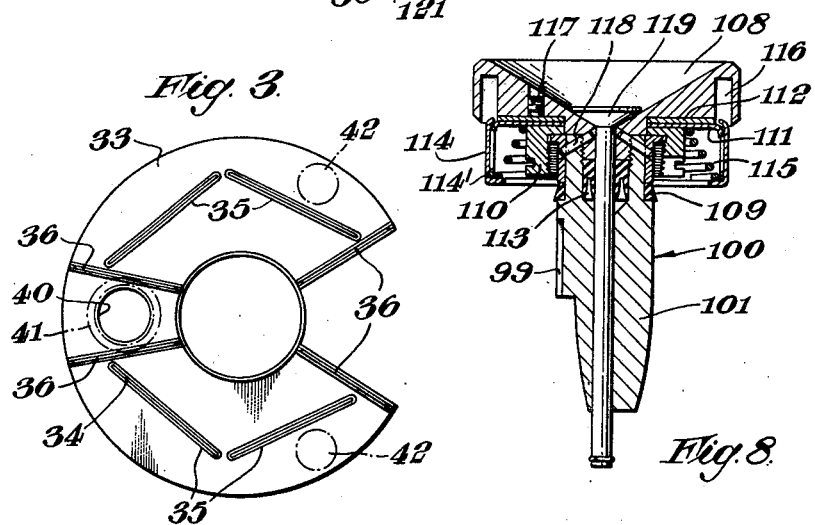

Dec. 22, 1964  F. H. GARDNER ETAL  3,162,192
ANAESTHETIC AND ANALGESIC INHALERS
Filed Oct. 9, 1962  5 Sheets-Sheet 2

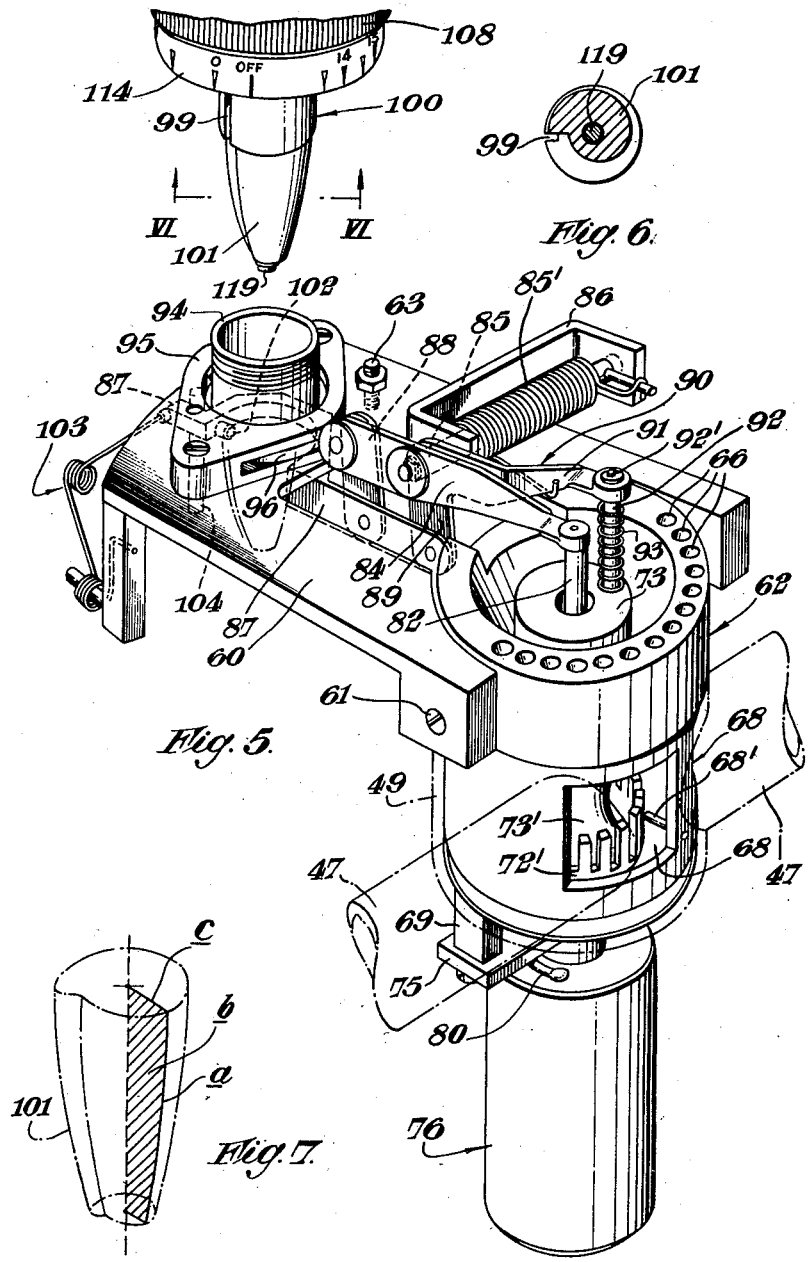

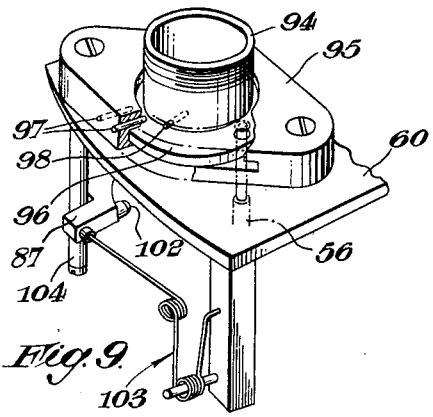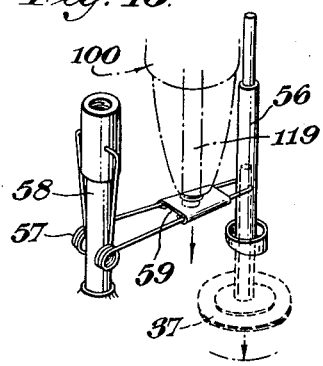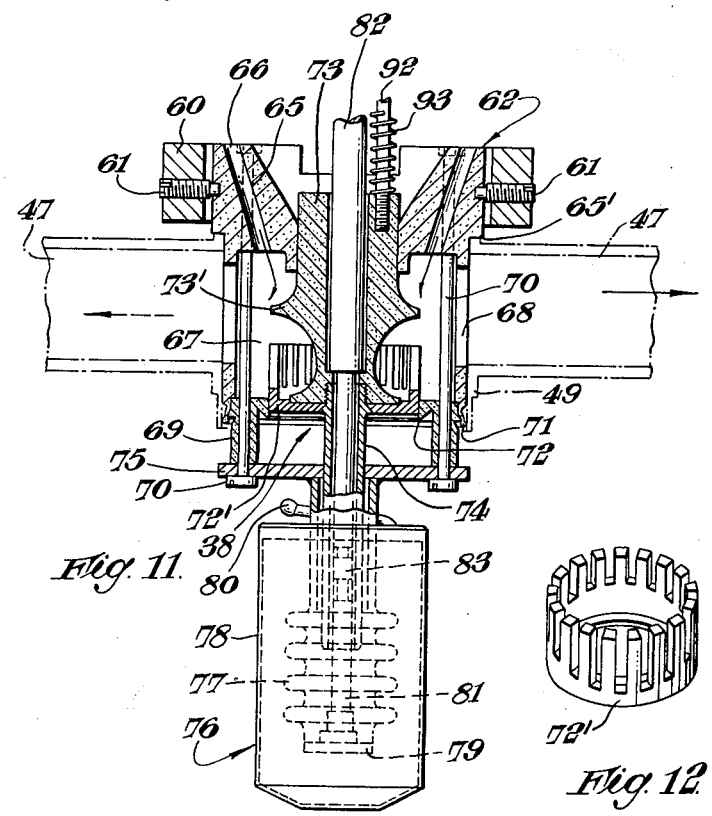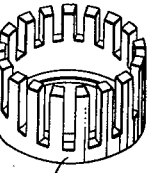

United States Patent Office 3,162,192
Patented Dec. 22, 1964

3,162,192
ANAESTHETIC AND ANALGESIC INHALERS
Frank H. Gardner, Oxford, England, and David T. Codd, 46 Wootton Road, Abingdon, Berkshire, England; said Gardner assignor to Air Reduction Company, Incorporated, New York, N.Y., a corporation of New York
Filed Oct. 9, 1962, Ser. No. 229,435
17 Claims. (Cl. 128—188)

The present invention relates to anaesthetic and analgesic inhalers, and concerns "draw-over" inhalers of the type, hereinafter referred to as of the type described, comprising a vaporising chamber to contain liquid agent for producing anaesthetic or analgesic vapour to be inhaled by the patient.

By a "draw-over" inhaler is to be understood an inhaler through which the patient himself inhales thereby to cause evaporation of a liquid anaesthetic or analgesic into the air being inhaled.

In order to cause evaporation of the liquid in the vapour chamber a known arrangement is to provide capillary active material (i.e. wick material) in the chamber which dips into free liquid contained in the chamber. Air is drawn into the chamber by the patient, through inlet means to the chamber, and flows through the chamber to outlet means from the chamber, the air flow carrying off from the chamber through the outlet means vapour evaporated from the wick material, this air/vapour being mixed in controlled manner with diluting air which by-passes the vaporising chamber to achieve a desired concentration.

According to the present invention there is provided a draw-over inhaler of the type described comprising a valve at an outlet of the vaporising chamber, means for diluting with by-pass air the air/vapour from the vaporising chamber, control means adjustable to give a chosen vapour concentration to the patient by varying the valve opening, and means responsive to temperature in the vaporising chamber acting on the control means substantially to maintain the chosen concentration for varying flow rate to the patient.

Advantageously the control means is adaptable to the use of various agents, and the control means varies the valve opening in response to the air/vapour temperature according to a predetermined relationship of these two variable functions for a chosen vapour concentration and agent.

According to a feature of the invention the control means includes, interchangeably for each agent, a three-dimensional cam of generally cone shape, the line along the cam surface defining an axial section on any radius constituting a characteristic curve of the said function relationship. In this case, the control means can be manually adjusted to give the chosen vapour concentration by rotation of the cam about its longitudinal axis, and a cam follower is constrained to move over the cam surface along the characteristic curve for that concentration. Suitably, the longitudinal movement of the cam follower is derived from the temperature responsive means and the consequent radial movement is transmitted to the valve at the vaporising chamber outlet to vary its opening.

According to a further feature of the invention the cam is rigid with a control knob, the combined cam and knob being replaceably inserted into the inhaler in the manner of a plug.

According to another feature of the invention the means for diluting with by-pass air comprises an annular body portion with a ring of tubular holes directed therethrough into a mixing chamber into which the outlet of the vaporising chamber opens, to give a substantially constant vapour concentration to the patient with any given opening of the vaporising chamber outlet valve. The vaporising chamber outlet valve then preferably comprises a cup-shaped member the cylindrical wall of which slides in an orifice from the vaporising chamber and is slotted longitudinally to allow the valve opening into the mixing chamber to be varied by sliding of the cup member in the orifice, the arrangement of the slots and of the by-pass air holes being such that the chosen vapour concentration to the patient is maintained by way of the temperature control of the valve opening.

According to yet another feature of this invention the inhaler comprises means for reversing the positions of the air intake to the inhaler and the air/vapour mixture outlet from the inhaler to the patient.

According to a further feature of the invention the inhaler comprises in the vaporising chamber capillary active means in the form of porous plastic material, for example porous polyethylene.

Figure 4:
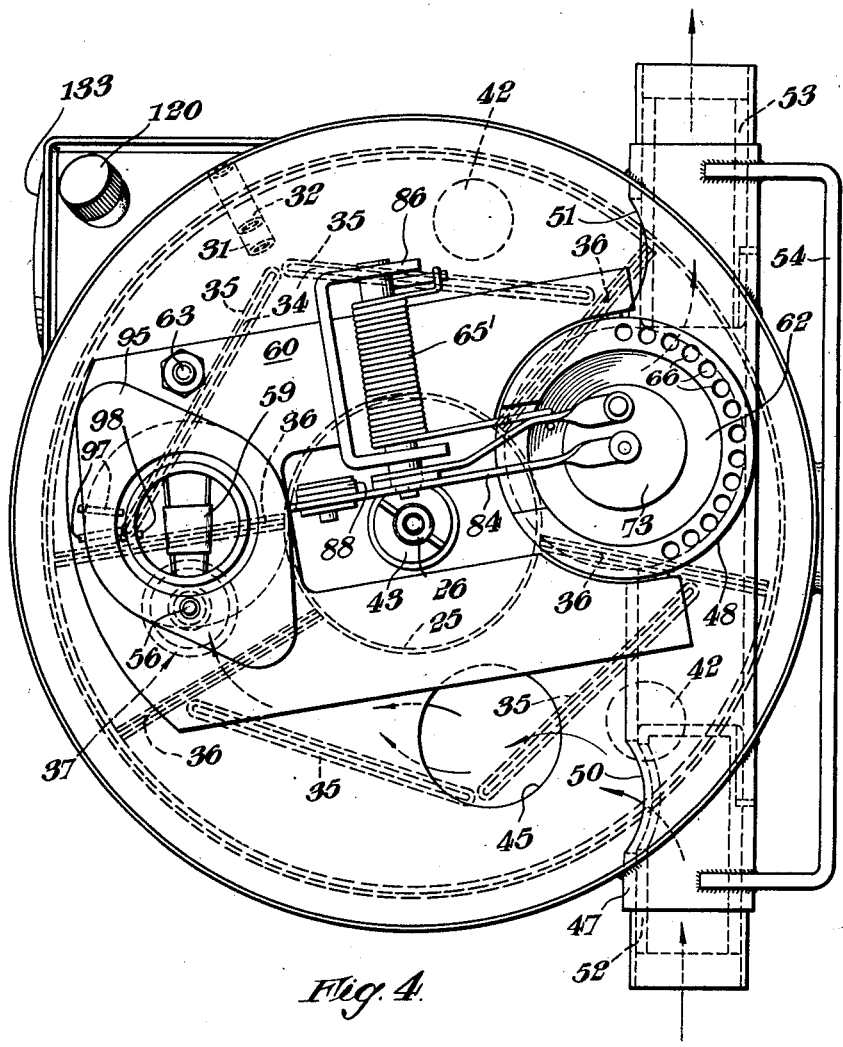

An embodiment of an inhaler according to the invention is hereinafter described, by way of example, with reference to the accompanying drawings in which:

FIG. 1 is a perspective view from the top end to one side of the inhaler proper, FIG. 2 is an axial section of the inhaler to illustrate the arrangement of various parts, FIG. 3 is a view from underneath of a disc fitted on a central column in the vaporising chamber and carrying capillary active socks and baffle plates, FIG. 4 is a plan view of the inhaler with the cover of the control mechanism compartment removed, FIG. 5 is a perspective partly exploded view of the control mechanism including the cam plug, FIG. 6 illustrates a radial section of a typical cam on the line VI—VI of FIG. 5, FIG. 7 illustrates a longitudinal section of a typical cam, FIG. 8 is an axial section of a cam plug, FIG. 9 is a perspective view showing detail of the cam plug guide tube, FIG. 10 shows a detail of the operation of the air inlet valve to the vaporising chamber, FIG. 11 is an axial section of the by-pass air control body showing the mixing chamber, the vaporising chamber outlet valve, and the temperature responsive unit, and FIG. 12 shows a slotted cup member of such outlet valve.

The inhaler comprises a lower open topped casing 20, an intermediate casing of mid-body 21 and a cover 22 on the mid-body.

The lower casing 20 comprises a jacket 23 filled with a heat retaining fluid, e.g. water, to surround the vaporising chamber 24. A central hollow column 25 defines part of the fluid jacket. A stud 26 fixed in the column is threaded at its lower end to receive the sealed filler and drain plug 27 a ring channel 28 is situated at the bottom of the vaporising chamber. The walls and floor of the chamber, including the ring channel, are covered with capillary active means preferably in the form of porous polyethylene sheet 29 made by sintering, e.g. the material "Vyon" (registered trademark). A liquid agent filler housing 30 has liquid and air passages 31 and 32 communicating with the vaporising chamber to fill the ring channel.

A disc 33 fits tightly for heat conduction on to the top of the column 25 and carries depending plates 34 over which are fitted socks 35 made of the capillary active material which dip into the liquid in the ring channel. Baffle plates 36 also depend from the disc 33, the arrangement in effect directing air, entering the chamber through an inlet valve 37, through four paths in parallel to the chamber outlet valve 38.

The mid-body 21 is generally dish shaped and seats on the lower casing by way of a ring seal 39 of inverted Y section providing a double sealing effect as shown in FIG. 2. The vaporising chamber inlet valve 37 is located in the floor of the mid-body and aligns with a corresponding hole 40 in the disc 33. A washer ring spacer 41 is located between the disc 33 and the mid-body floor, around the inlet valve 37 with corresponding solid spacers 42 resting at suitable positions on the disc. The spacers are of deformable material such as cork. The mid-body is clamped down on to the lower casing by a nut 43 threaded on the upper end of the stud 26 and locking against a tubular collar 44 located centrally in the mid-body floor. This floor is constructed with a cavity 45, the floor section being generally the shape of a shallow cone with a hole 45' in the upper wall of the floor allowing free access of air to the cavity and thereby to the inlet valve 37. A sleeve 46 on the stud 26 compresses an O-ring seal between its upper end and a shoulder in the collar 44 on clamping.

A tube 47 is built into the mid-body and extends therethrough across the near side. An opening 48 in the side wall of the tube co-operates with a well formation 49 in the mid-body in which is located a control body with by-pass air and/vapour mixing chamber as will be described later. Openings 50 and 51 are also provided in the side wall of the tube, one near each end for common intake of air. Sleeves 52 and 53 are located in the open ends of the tube. The sleeve 52 has a blocked end to block off passage to the mixing chamber and a side wall opening aligning with that in the tube for air intake.

The sleeve 53 is open-ended to allow passage to the mixing chamber but it blocks the adjacent side wall opening in the tube. Thus, interchange of the sleeves allows the positions of the air intake to the inhaler and air/vapour outlet to the patient to be reversed, with advantage in alternative positioning of the unit in relation to the patient. The sleeves 52, 53 have keyways engaging pins in the tube to locate against rotation, and abut axially against shoulders in the tube. Both ends of the tube are adapted to receive a hose connection to the patient.

A mounting bar 54 extends across the back of the mid-body parallel with the axis of the tube 47, to secure the unit to a trolley.

The air inlet valve 37 to the vaporising chamber comprises a metal backed sealing disc 55 which closes against a seating in the mid-body floor. The stem 56 of the valve extends upwards and the sealing disc is urged up against its seating by a divided coil hair spring 57 attached to a pillar 58 fixed in the mid-body floor. A small clamp plate 59 keeps the prongs of the spring engaged with the valve stem and has another purpose explained later.

The control mechanism as shown in FIG. 5 is mounted on a plate 60 initially rockable for location purposes by way of grub screw trunnions 61 engaging a by-pass air control body 62 adapted to fit into the well 49 in the mid-body. The plate 60 is located in the mid-body by a screw fixing 63 into the top of the pillar 58 on the mid-body and also rests on a further locating pillar 64 fixed on the mid-body floor.

The control body 62 as shown in FIG. 11 comprises an annular body portion 65 formed with a ring of tubular holes 66 directed therethrough into a mixing chamber 67. A divided opening 68 in the side of this chamber aligns with the tube 47 in the mid-body, when the body portion 65 is seated down by way of its shoulder 65' on the upper edge of the well 49. A generally cylindrical member 69 engages within the lower end of the body portion 65 and is drawn upwards by bolts 70 against a shoulder therein to expand a seal 71, formed on the body portion, against the wall of the well 49. The member 69 is formed with an orifice 72 of the air/vapour valve 38 in which a cup 72' slides by way of its cylindrical side wall which is slotted longitudinally. The cup 72' is clamped between a bobbin 73 and a downwardly extending sleeve 74 screwed into the bobbin. The bobbin slides within the annular body portion 65, and is formed with gas deflecting surfaces 73'. A pointer 68' is fixed at the opening 68 in the side of the mixing chamber visible through the tube 47 from the inhaler outlet to assist determination of the position of the valve 38.

A bracket 75 carries a temperature responsive unit 76 below the air/vapour valve to depend into the vaporising chamber. The unit 76 is of generally known kind comprising a metal bellows 77 FIG. 12 attached at its upper end to a container 78 with its lower end wall assembly 79 spaced from the bottom of the container.

The space within the container between the container walls and the bellows is filled with an expansion liquid free of air which has been boiled off under reduced pressure prior to its sealing in the container by closure of the tube 80. This ensures that the filling consists exclusively of liquid phase. An organic filling liquid of high thermal expansion co-efficient is used. The use of such liquids has obvious advantages as regards the range of control movement which is obtained by their large expansion and contraction with change of temperature although this is offset by their relatively low co-efficient of heat conductivity which can make their response to temperature change rather slow. This difficulty is however overcome by a construction of bellows assembly in which only a thin layer of the liquid is employed around the bellows which is exposed to the ambient temperature within the vaporising chamber on the outside through the side wall and the end closures of the container and on the inside through the bellows the air space in which is heated by conduction through the unit body. To increase the response the container and the bellows are constructed of high conductivity metal such as brass or copper.

Control-mechanism actuating means in the form of rods 81, 82 with interposed bearing and sealing parts 83 extends upwardly from the lower end wall assembly 79 of the bellows through the sleeve 74 and bobbin 73. The upper end of the rod 82 acts through a spherical bearing against a temperature function lever 84 which is hinged on a shaft 85 FIG. 6 located for rotation about its longitudinal axis in a bracket 86 fixed on the mounting plate 60. The lever 84 forms one side of a parallelogram linkage, the parallel member of the linkage being a cam follower lever 87. A link 88 pivotally connects the other end of the temperature function lever 84 to the parallel cam follower, and one arm 89 of a bell-crank lever 90 is parallel with the link 88, the lever 90 being free to pivot about the shaft 85. The other arm 91 of the bell crank lever 90 is formed into a cup ring bearing upwardly against a spherical bearing 92' screwed into the upper end of a shaft 92 screwed at its lower end into the control bobbin 73. A coil spring 93 surrounding the shaft 92 urges the cup ring of the arm 91 upwards against the bearing 92'. A torsion spring 85' surrounds the shaft 85 one end of the spring tending to twist the shaft clockwise as shown to bring the cam follower lever to its highest position, and the other end tending to force the bell crank lever arm 91 upwards into the closed position of the outlet valve from the vaporising chamber.

A cam plug guide tube 94 is rotatably mounted in a housing 95 screwed to the mounting plate 60, the guide tube having a flange 96 fixed at its lower end by which it seats on the plate 60. Limit pins 97 in the housing 95 determine the extent of rotation of the guide tube in conjunction with a pin 98 fixed through the wall of the guide tube. In one limiting or "off" position of the guide tube a vertical hole through the flange 96 aligns over a hole in the mounting plate 60 and the upper end of the stem 56 of the air inlet valve 37 to the vaporising chamber mates upwardly through the holes, the valve being closed by the hair spring 57.

The inner end of the pin 98 in the guide tube is received in a keyway 99 in a cam plug 100.

A cam plug is provided for each liquid agent, the plugs being interchanged according to the agent being used.

Each plug comprises a three-dimensional cam 101 of generally cone shape. The shape of the cam surface is fashioned so that, as illustrated in FIG. 7, the line $a$ along the cam surface defining an axial section $b$ on any radius $c$ constitutes a characteristic curve or graph of the vaporising chamber outlet valve opening plotted against the air/vapour temperature, for the given agent at a certain vapour concentration to the patient. Initially the characteristic curves are plotted empirically and the cam surface shape fashioned accordingly. The longitudinal movement of the cam follower ball 102 on the lever 87, which is constrained to follow the cam surface, is derived through the temperature function lever 84 from the temperature responsive unit 76 and the consequent radial movement of the follower is transmitted through the bell crank lever 90 to vary the opening of the outlet valve from the vaporising chamber according to the predetermined characteristic at the chosen vapour concentration to the patient so as to maintain that concentration for varying flow or respiration rate to the patient. The varying flow rate is detected as a change of temperature in the vaporising chamber which affects the temperature responsive unit.

A subsidiary spring 103 serves in conjunction with a fixed vertical guide rod 104 to restrict movement of the cam follower to a fixed plane through the longitudinal axis of the cam, to assist in urging the follower radially inwards against the cam surface and to urge the follower to its uppermost position on the cam.

Prior to insertion of a cam plug, the cover 22 is clamped during assembly to the mid-body by a bolt 105 threaded into the upper end of the stud 26 projecting through the mid-body floor, a sealing compound being used around the joint 106 at the edge of the cover over the wall of the mid-body. A "Wilson" seal 107, of the type which tightens under escape pressure is secured in the cover around an opening which passes over the cam plug guide tube. A pointer 107′ is fixed in the cover adjacent to the cam plug position.

In each cam plug 100, the cam 101 is screwed on to a control knob 108 with the interposition between shoulders on the two parts of a seal ring 109, an internally threaded collar nut 110, a scale carrying plate 111 and a backing plate 112. A radially inner seal ring 113 is also interposed between the cam and control knob. The plate 111 carries a cylindrical scale 114 fixed on an inner ring 114′ having longitudinal slots in which tangs on the plate 111 engage. The scale thus rotates with the plate but is slidable upwards thereon, against the action of a coil spring 115, into a circular recess 116 in the underside of the control knob. The top of the scale is flanged inwards to seat on the plate 111. A grub screw 117 serves to lock the scale carrying plate and collar nut 110 friction tight to rotate with the cam plug. The cam is locked to the control knob by pins 118.

The cam plug is inserted into the guide tube 94 with rotary location by the pin 98 and keyway 99 as mentioned above. The seal 109 lies against the guide tube wall and the collar nut 110 is screwed down on to the threaded upper end of the guide tube to locate the plug axially. The collar nut 110 is accessible on pressing up the scale against the spring 115, and is rotatable independently of the cam plug with the grub screw 117 slackened.

A headed plunger 119 is slidable axially through the cam plug and is located against upward removal by a circlip. The lower end of the plunger engages upon the clamp plate 59 associated with the air inlet valve 37 to the vaporising chamber.

The liquid agent filler housing 30 comprises a stopper 120 screwed into a rod 121 projecting upwardly from the floor of the housing through the inlet orifice. The housing 30 is formed with a pouring lip 122, and a sealed window 133 gives a direct visual indication of the level of the liquid agent.

The operation of the inhaler is as follows:

The vaporising chamber jacket is filled with its heat retaining fluid, the temperature of which has been chosen to maintain in the chamber a normal room temperature, independent of ambient temperature. A chosen liquid agent is introduced into the ring channel through the filler housing.

A cam plug corresponding to the chosen liquid agent is inserted in the cam plug guide tube 94 and screwed down on to it in the manner described. The scale locating grub screw 117 is untightened and the scale rotated on the stationary cam plug until an "off" mark on the scale is aligned with the fixed pointer on the cover 22. The grub screw 117 is then tightened so that the scale will rotate as one with the cam plug.

In this position of the cam the outlet valve 38 from the vaporising chamber is arranged to be in closed position. The vaporising chamber inlet valve 37 is also closed so that the chamber is completely sealed.

The plunger 119 in the cam plug is then depressed to open the inlet valve 37 by way of the clamp plate 59 against the action of the valve spring 57. The valve stem is thereby withdrawn downwardly from its position locking the cam plug guide tube against rotation. The cam control knob with the guide tube is then turned slightly to align a "zero" or "O" concentration mark on the scale with the fixed pointer. The valve 37 is thereby held open by the guide tube flange 96. The vaporising chamber outlet valve 38 is still arranged to be closed in this cam position.

The control knob is thereafter turned to align with the fixed pointer the marking corresponding to the chosen vapour concentration to the patient. This opens the outlet valve 38 to a predetermined extent by way of the cam follower lever and parallelogram linkage.

Air is drawn through the selected inhaler intake into the mid-body chamber from where it passes through the hole 45′ in the conical upper wall of the mid-body floor to the vaporising chamber inlet valve, to give air/vapour out of the vaporising chamber outlet valve.

By-pass or diluting air also passes from the mid-body chamber through the control body tubes 66 to intermingle with the air/vapour in the mixing chamber 67. The tubes 66 are inwardly inclined to give a suitable direction of flow, whilst the deflecting surfaces on the bobbin 73 in this chamber avoid pressure interference between the by-pass air and the air/vapour and valve cup.

The arrangement of the control body tubes 66 and of the outlet valve slots is arrived at empirically to maintain, in a compact construction, any chosen vapour concentration to the patient at a given valve opening and flow rate.

Variation of the flow or respiration rate affects the temperature in the vaporising chamber as mentioned above to automatically vary the valve opening by way of the control mechanism including the cam, thereby compensating for the change in flow rate and maintaining the desired vapour concentration.

For example, if the flow rate drops, the temperature in the vaporising chamber rises due to less evaporation of the agent and less latent heat taken for evaporation. The liquid in the temperature responsive unit expands and forces the bellows to contract upwards, thereby moving the cam follower through the parallelogram linkage downwardly along the predetermined characteristic curve of temperature against valve opening for the chosen vapour concentration. There is a consequent radially inward movement of the cam follower, which is constrained by the various springs to follow the characteristic curve, this movement being transmitted back through the parallelogram linkage to raise the valve bobbin 73 and thereby reduce the valve opening to allow less vapour to pass to maintain the chosen concentration for the lower flow rate.

The arrangement is such that flow resistance is substantially unaffected, the main flow always being through the air by-pass.

The by-pass tubes 66 and valve slots are arranged substantially symmetrically with respect to the mixture chamber outlet, so that reversal of the flow from the mixture chamber along the intake/outlet tube 47 would not affect the flow characteristics.

Concerning materials used, the lower casing and the mid-body can be fabricated from spun and pressed stainless steel component parts, vacuum brazed together to avoid distortion which may occur with ordinary arc welding.

The cams should be of suitably hard material to retain their characteristic surfaces, e.g. brass or stainless steel. Polyacetal plastics material is preferred, however.

The control body members 65 and 69 at the bobbin 73 are also preferably of plastics material.

For appropriate bearing or sealing surfaces polytetrafluoroethylene ("PTFE") or other plastics based material with similar hard-wearing and self-lubricating characteristics may be used.

The sock-carrying and baffle plates and their carrier disc 33 are preferably made of copper i.e. for good heat conduction to the central column of vaporising chamber as mentioned.

Care has to be taken that all materials are resistant to attack by or to contamination of the various agents.

Various modifications of the above described embodiment are possible, for examples:

The cam and control knob can be moulded integrally to form the cam plug, with suitable scale attachment for the desired "zeroing" as described. The associated seals would be formed integrally with the moulding. Polyacetal plastics material may be used, or any other suitable hard substance as mentioned for the cam. The torsion spring 85' and the subsidiary spring 103 act in conjunction to constrain the cam follower to follow the desired path. Apart from its vertical plane guiding action, the subsidiary spring is found necessary to maintain the position of the follower near its uppermost, i.e. minimum temperature, position. This latter function could be taken over by the torsion spring 85' by providing a clamp mid-way along its length which abuts against a fixture on the adjacent mounting plate so that torsion is transmitted to the control function bell crank lever by the end of the spring located thereunder to force the follower against the cam. When the temperature function lever has rotated to a sufficient degree to ensure constraint of the follower simply by the action of the torsion spring between the temperature function lever and the control function bell crank lever, the clamp would turn away, with the spring, from the said abutting position so that the spring then functions normally.

The capillary active means has been described as preferably of porous polyethylene. It is alternatively found possible to use thin pierced and expanded copper sheet of fine mesh, e.g. 0.030 in. or 0.75 mm. mesh, so called "mini-mesh," fitted tightly against a metal backing wall. The discrete holes in the sheet are not in themselves capillary active, but there may be said to be capillary action between the sheet and the backing which gives the desired effect.

For the liquid agent filler housing, the described stopper arrangement can be replaced by a spring-loaded combined filler and drain valve device. A filler valve would be spring-urged upwardly against a seating around the filler orifice and a drain valve spring-urged against a drain hole in the floor of the housing, the valves being slidably arranged with lost motion in relation to a single operating member whereby depression of the member from a mean position would open the filler valve and raising of the member from the mean position would open the drain valve.

The cam plugs may be distinguished by colour according to the liquid agent, or otherwise clearly distinguished.

Where reference is made herein to maintaining or substantially maintaining a chosen vapour concentration to the patient, this is to be understood to mean maintained within clinically permissible limits.

The term "air" has been used herein to cover any equivalent aeriform respirable medical gas.

We claim:

1. An anaesthetic inhaler comprising a casing, a vaporising chamber defined in said casing to contain a liquid agent, a gas inlet to and an outlet from said chamber, a valve located in said casing at said chamber outlet, means to dilute gas/vapour from said chamber outlet with gas by-passing said chamber, outlet means for such gas/vapour mixture from said casing to the patient, means responsive to temperature in said chamber, and control means carried by the casing and including for a given agent a three-dimensional cam presenting a series of characteristic curves each of a predetermined relationship at a given vapour concentration of such agent between the outlet valve opening and gas/vapour temperature, such control means being manually adjustable to give a chosen vapour concentration to the patient by selection of the respective cam curve and said temperature responsive means acting to automatically control said outlet valve opening during use by way of the selected cam curve to maintain the chosen vapour concentration to the patient.

2. An inhaler according to claim 1 wherein the cam is replaceably insertable into the casing in the manner of a plug and is interchangeable for different agents.

3. An anaesthetic and analgesic inhaler comprising a casing, a vaporising chamber defined in said casing to contain a liquid agent, a gas inlet to and an outlet from said chamber, a valve located in said casing at said chamber outlet, means to dilute gas/vapour from said chamber outlet with gas by-passing said chamber, outlet means for such gas/vapour mixture from said casing to the patient, means responsive to temperature in said chamber, and control means including, interchangeably for each such agent, a three-dimensional cam of generally cone shape of which the line along the cam surface defining an axial section on any radius constitutes a characteristic curve of a predetermined relationship at a given vapour concentration of such agent between the outlet valve opening and gas/vapour temperature, such control means being manually adjustable to give a chosen vapour concentration to the patient by selection of the respective cam curve and said temperature responsive means acting to automatically control said outlet valve opening during use by way of the selected cam curve to maintain the chosen vapour concentration to the patient.

4. An inhaler according to claim 3, wherein the control means is manually adjusted to give the chosen vapour concentration by rotation of the cam about its longitudinal axis, and a cam follower of the control means and by way of which said temperature responsive means acts to control said outlet valve opening is constrained to move over the cam surface along the characteristic curve for that concentration.

5. An inhaler according to claim 4 including a guide tube rotatably mounted in the casing, means to key the cam replaceably in said guide tube for positioning the cam in relation to the cam follower, a valve resiliently urged to close the gas inlet to the vaporizing chamber, and means to lock said guide tube against rotation in the position corresponding to the closed position of the vaporizing chamber outlet valve until said inlet valve is opened.

6. An inhaler according to claim 5 wherein a control knob is unitary with the cam, the combined cam and knob is replaceably insertable into the casing in the manner of a plug, with the cam plugging into the guide tube, and means to open said inlet valve including a plunger slidable axially through such plug.

7. An inhaler according to claim 4, wherein the longitudinal movement of the cam follower is derived from the temperature responsive means and the consequent radial movement is transmitted to the valve at the vaporising chamber outlet to vary its opening.

8. An inhaler according to claim 7, including a parallelogram linkage by way of which the temperature responsive means moves the cam follower and from which the radial movement of the cam follower is transmitted, and resilient means loading the linkage to constrain the cam follower to move longitudinally over the cam surface.

9. An inhaler according to claim 8, wherein subsidiary resilient means and guide means act in conjunction on the cam follower to restrict its movement to a fixed plane through the longitudinal axis of the cam.

10. An inhaler according to claim 9, wherein the subsidiary resilient means acts also to assist in urging the follower radially inwards against the cam surface and to urge the follower towards a datum position longitudinally of the cam.

11. An inhaler according to claim 3, wherein a control knob is rigid with the cam, the combined cam and knob being replaceably inserted into the inhaler in the manner of a plug.

12. An inhaler according to claim 11, wherein a pointer is fixed on the casing and the plug carries a scale of a desired range of vapour concentration to co-operate with said pointer and means to lock the scale to rotate with the plug after initial setting of the scale against the fixed pointer.

13. An inhaler according to claim 3, comprising means for reversing the positions of the gas intake to the casing and the gas/vapour mixture outlet from the casing to the patient.

14. An inhaler according to claim 13, comprising a chamber in which the gas/vapour and by-pass gas are mixed, a tube extending through the casing with a wall opening leading from said mixing chamber and with wall openings one near each end for common intake of gas to the vaporising chamber and the gas by-pass means, and sleeves interchangeably located one in each tube end, one sleeve having a closed inner end to block passage from the tube end to the mixing chamber and having a wall opening aligning with that for air intake at its end of the tube and the other sleeve being open ended to allow passage from the mixing chamber whilst being arranged to block the gas intake opening at its end of the tube.

15. An inhaler according to claim 3 wherein the temperature responsive means is fixed below the orifice of said outlet valve so as to depend into the vaporising chamber, the dilution means comprises an annular body coaxial with said outlet valve, and means to actuate said outlet valve by way of the control means extends upwardly from said temperature responsive means axially through said outlet valve and diluter body.

16. An anaesthetic vaporiser for delivering to a patient preselected concentrations of a vaporised liquid anaesthetic agent in admixture with a respirable diluent gas comprising a casing, a chamber defined in said casing for holding a supply of a liquid anaesthetic agent, means for delivering a respirable diluent gas through said chamber and obtaining therefrom a gas mixture comprising the vapour of said anaesthetic agent and said diluent gas, means for supplying a flow of a diluent gas and admixing said flow of diluent gas with said mixture from said chamber to form an inhalant mixture for delivery to a patient, valve means located in said casing and operable to control the flow of said mixture from said chamber to produce a range of desired predetermined vapour concentrations in said inhalant mixture, temperature responsive means responsive to the temperature of the mixture in said chamber to adjust said valve means in response to changes in such temperature, adjustable control means calibrated separately for each of a plurality of preselected vapor concentrations determining the positions of said valve means, and actuating means operatively connected with said control means and said temperature responsive means for automatically positioning said valve means in response to such temperature changes to maintain such preselected vapour concentration constant.

17. In an anaesthetic vaporiser having a casing, a vaporiser chamber defined in said casing to contain a liquid anaesthetic agent, a diluent gas passage through said chamber and in by-pass relation thereto, valve means located in said casing for controlling the flow of diluent gas through said vaporising chamber, thereby to form inhalant mixtures for delivery to a patient containing preselected concentrations of the anaesthetic vapour, the improvement comprising:

control means including cam-like means defining the position of said valve means for each preselected concentration over a range of temperature variations, actuating means for displacing said valve means in response to its position relative to said control means, and temperature responsive means for adjusting the position of said actuating means relative to said control means in response to the temperature in said vaporising chamber to maintain a preselected vapor concentration constant.

References Cited by the Examiner

UNITED STATES PATENTS

| | | | |
|---|---|---|---|
| 1,279,549 | 9/18 | Johnston et al. | 128—203 |
| 2,206,688 | 7/40 | Bloomheart | 128—188 |
| 2,553,446 | 5/51 | Edmondson et al. | 128—188 |
| 2,906,463 | 9/59 | Curry | 128—186 |
| 2,941,528 | 6/60 | Fabian | 128—188 |
| 2,944,545 | 7/60 | Dietrich et al. | 128—191 |

FOREIGN PATENTS

| | | |
|---|---|---|
| 648,191 | 1/51 | Great Britain. |
| 650,214 | 2/51 | Great Britain. |
| 696,769 | 9/53 | Great Britain. |
| 701,206 | 12/53 | Great Britain. |

RICHARD A. GAUDET, *Primary Examiner.*

JORDAN FRANKLIN, *Examiner.*